(12) United States Patent
Lian

(10) Patent No.: US 7,163,346 B2
(45) Date of Patent: Jan. 16, 2007

(54) KEYBOARD AUGMENTING HOT KEY STRUCTURE

(76) Inventor: Hui Pin Lian, 1F, No. 18, Lane 172, Tai-an 2nd St., Changhua City, Changhua County 500 (TW)

( * ) Notice: Subject to any disclaimer, the term of this patent is extended or adjusted under 35 U.S.C. 154(b) by 104 days.

(21) Appl. No.: 10/945,908

(22) Filed: Sep. 22, 2004

(65) Prior Publication Data

US 2006/0062625 A1 Mar. 23, 2006

(51) Int. Cl.
*G06F 3/023* (2006.01)
(52) U.S. Cl. ............................ 400/489; 400/472
(58) Field of Classification Search ............ None
See application file for complete search history.

(56) References Cited

U.S. PATENT DOCUMENTS 5,733,056 A * 3/1998 Meagher .................. 400/472
6,707,664 B1 * 3/2004 Murphy .................... 361/680
2005/0168446 A1* 8/2005 Majdoub .................... 345/168

FOREIGN PATENT DOCUMENTS

JP 2003167662 A * 6/2003
JP 2003316494 A * 11/2003

OTHER PUBLICATIONS

Machine translation of JP 2003-167662 to Watanabe et al. from Japanese Patent Office website.*

* cited by examiner

*Primary Examiner*—Daniel J. Colilla
(74) *Attorney, Agent, or Firm*—Troxell Law Office, PLLC

(57) ABSTRACT

A keyboard augmenting hot key structure consisting of a main keyboard having expansion keyboards disposed at its lateral ends, the expansion keyboards each situated on a preloaded torque spring in the main keyboard internal section. A drive structure maintains the expansion keyboards within the main keyboard internal section such that when the expansion keyboards are not utilized, they are concealed within the internal section of the main keyboard. When the expansion keyboards are utilized, the operation of the drive structure torque springs impels the expansion keyboards outward from the main keyboard such that given the unchanged, overall keyboard physical size, there is usable space for accommodating numerous hot keys, providing the users to collect the expansion keyboards at will and without occupying space when the expansion keyboards are not utilized.

7 Claims, 8 Drawing Sheets

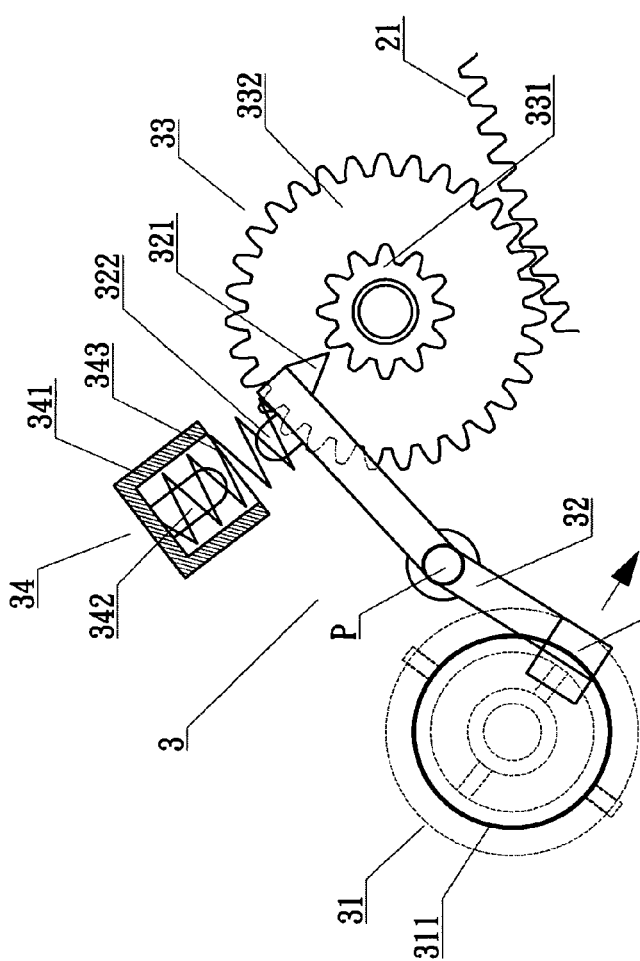
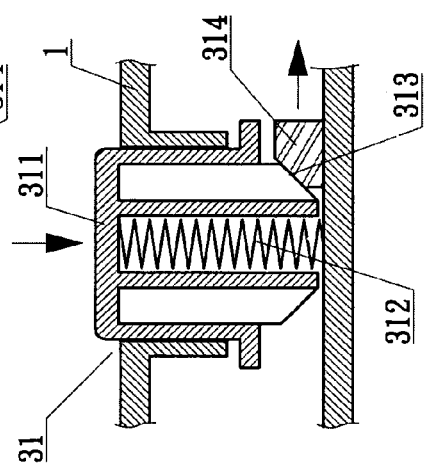
FIG. 5
FIG. 5-A

KEYBOARD AUGMENTING HOT KEY STRUCTURE

BACKGROUND OF THE INVENTION

1) Field of the Invention

The invention herein relates to a keyboard augmenting hot key structure in which a main keyboard has expansion keyboards disposed at its lateral ends, the said expansion keyboards each situated on a preloaded torque spring in the main keyboard internal section. A drive structure maintains the expansion keyboards within the main keyboard internal section such that when the expansion keyboards are not utilized, they are concealed within the internal section of the main keyboard. When the expansion keyboards are utilized, the operation of the drive structure torque springs impels the expansion keyboards outward from the two sides of the main keyboard such that given the unchanged, overall keyboard physical size, there is usable space for accommodating numerous hot keys, providing the users to collect the expansion keyboards at will and without occupying space when the expansion keyboards are not utilized.

2) Description of the Prior Art

If a conventional keyboard is to be equipped with hot keys, it is typically necessary to widen the area along the two sides of the keyboard for placing the hot keys. However, since the integration of hot keys on the keyboard involves additional area, the physical size of the keyboard becomes larger and, furthermore, there is often no way of remedial reduction, the greater dimensions results in higher shipping costs.

BRIEF DESCRIPTION OF THE DRAWINGS

FIG. 4-A is a cross-sectional drawing of the push button assembly.

FIG. 5 is an orthographic drawing of the drive structure in the pressed state.

FIG. 5-A is a cross-sectional drawing of the push button assembly in the pressed state.

DETAILED DESCRIPTION OF THE PREFERRED EMBODIMENTS

Figure 1:
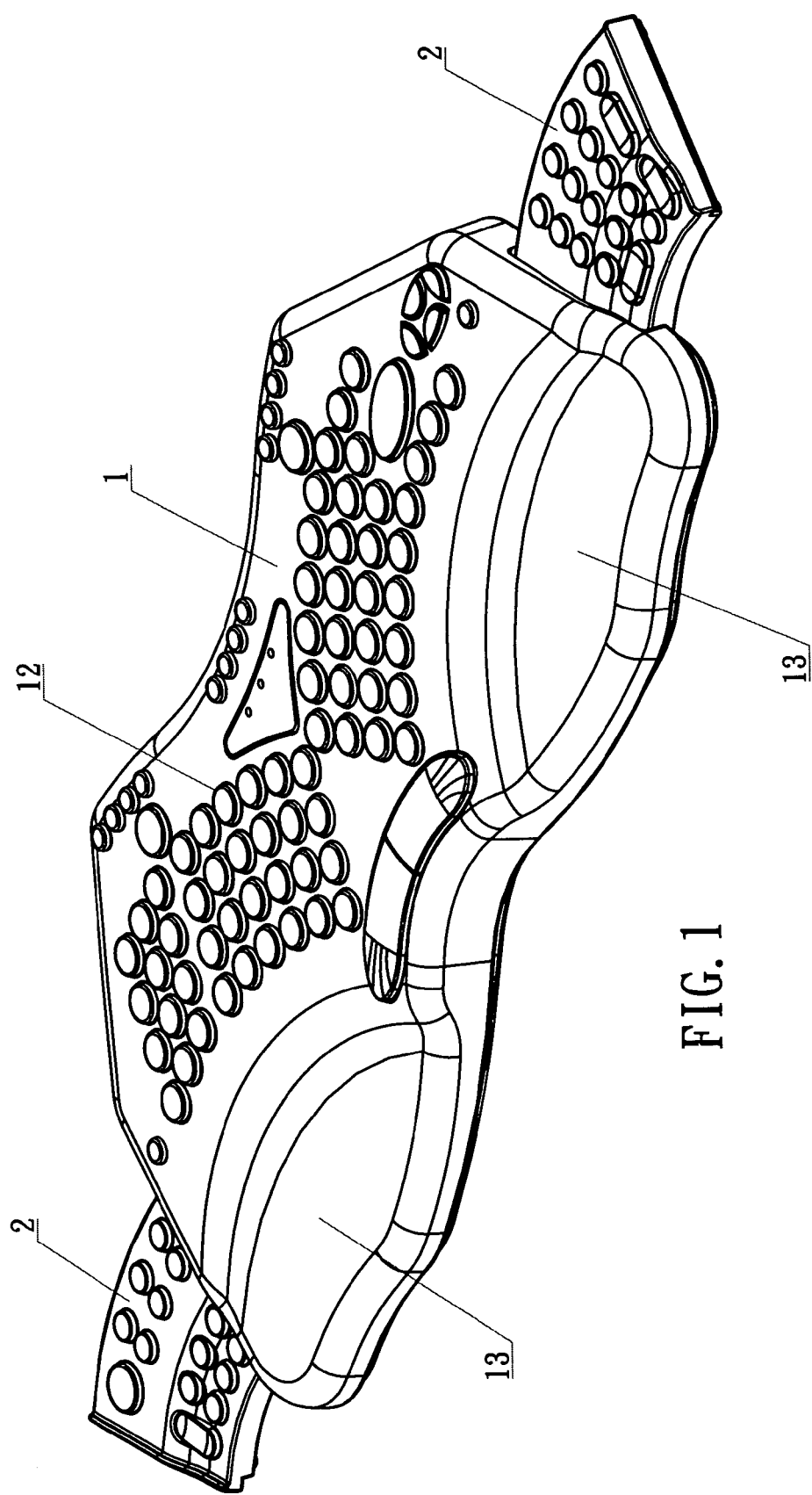
FIG. 1 is an isometric drawing of the invention herein.

Referring to FIG. 1, FIG. 2, FIG. 3, FIG. 4, FIG. 4-A, and FIG. 5, the structural arrangement of the present invention, the invention herein consists of expansion keyboards 2 that are impelled out from the lateral ends of a main keyboard 1, wherein:

The said main keyboard 1 has keycaps 12 disposed in an inverted-V formation and, furthermore, the main keyboard 1 lower end position that provides for resting both hands of the user is a contoured surface 13 facilitating hand comfort and support.

The said expansion keyboards 2 are each situated on a preloaded torque spring 11 in the main keyboard 1 internal section; a drive structure 3 maintains the expansion keyboards 2 within the main keyboard 1 internal section, or the drive structure 3 impels the expansion keyboards 2 out from the two sides of the main keyboard 1.

The said drive structure 3 is comprised of a push button assembly 31, a transmissive coupling rod 32, a transmissive gear assembly 33, and a spring assembly 34, wherein:

The said push button assembly 31 push button 311 protrudes through the main keyboard 1 surface and, furthermore, a spring 312 is installed inside the push button 311, a beveled surface 313 is formed around the lower circumferential edge of the push button 311, and a thrust block 314 is situated against the beveled surface 313.

The said transmissive coupling rod 32 has one extremity against the side of the push button assembly 31 thrust block 314, a sharp pawl block 321 projects from the bottom surface of the extremity and, furthermore, the pawl block 321 is against the transmissive gear assembly 33 driving gear 331 and a locating block 322 protrudes from the top surface of the transmissive coupling rod 32 extremity to appropriately limit the position of the spring 34; additionally, the said transmissive coupling rod 32 center section is movably disposed at the main keyboard 1 internal section such that the transmissive coupling rod 32 pivots on a hinge pin section P.

The said transmissive gear assembly 33 includes the synchronously rotating driving gear 331 and a driven gear 332, the teeth surface of the driving gear 331 providing for contact against the transmissive coupling rod 32 pawl block 321, the driven gear 332 enmeshed with the expansion keyboard 2 case edge teeth surface 21 such that when the transmissive gear assembly 33 rotates, the expansion keyboard 2 swings out.

The said spring assembly 34 at the main keyboard 1 internal section is pre-positioned in a mounting seat 341 on the side of the transmissive coupling rod 32 locating block 322 and, furthermore, a guide post 342 extends from the inside of the mounting seat 341 and a return spring 343 is situated between the guide post 342 and the transmissive coupling rod 32 locating block 322 to restore the position of the transmissive coupling rod 32.

Figure 2:
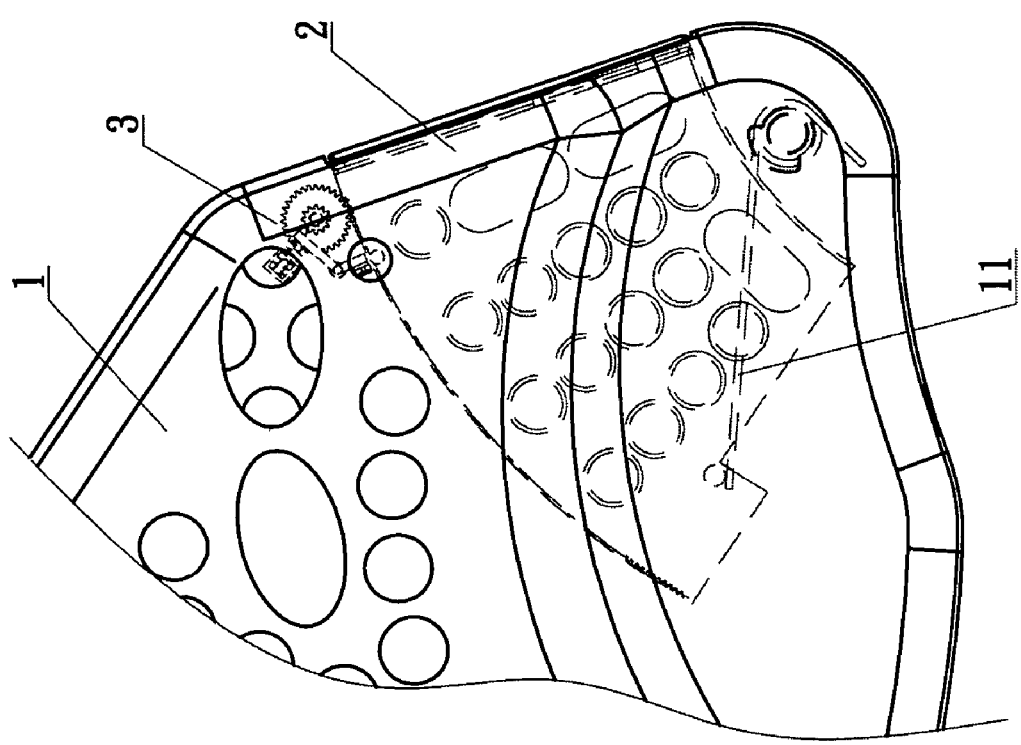
FIG. 2 is an orthographic drawing of the expansion keyboard in the concealed state.
Figure 3:
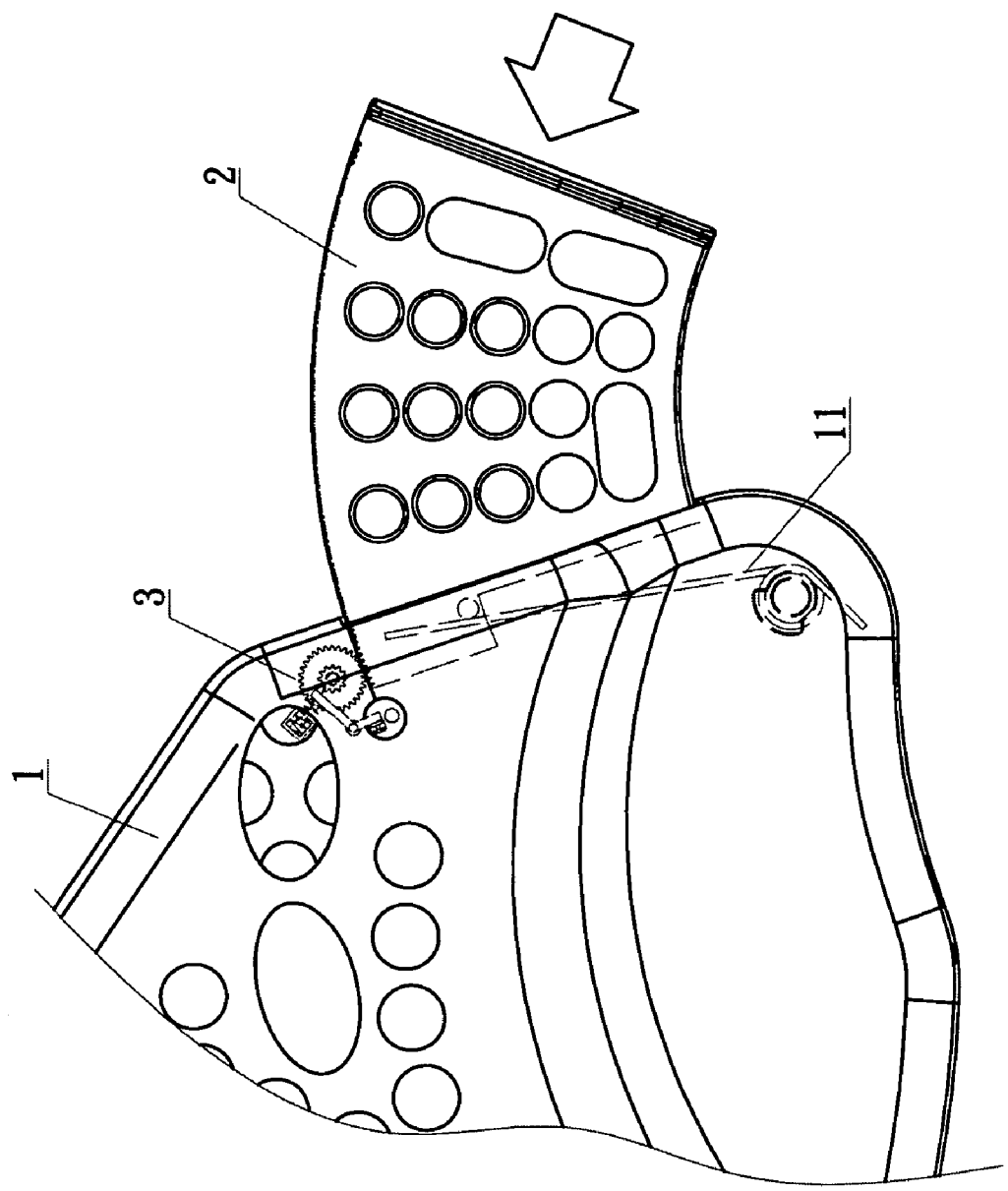
FIG. 3 is an orthographic drawing of the expansion keyboard in the impelled-out state.
Figure 4:
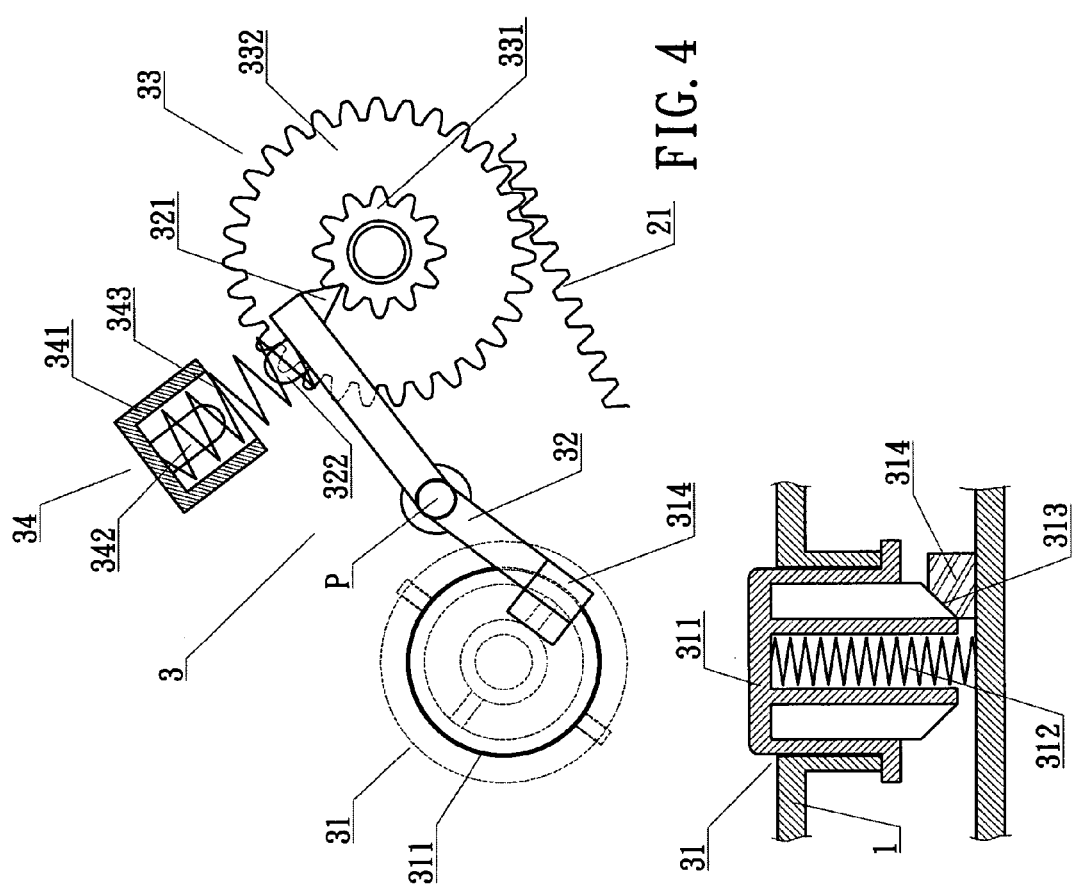
FIG. 4 is an orthographic drawing of the drive structure in the normal state.

As for operation, referring to FIG. 2, FIG. 4, and FIG. 5, with the keyboard in the normal state, the expansion keyboard 2 preloaded torque springs 11 are flexed back and each transmissive coupling rod 32 extremity is against the transmissive gear assembly 33 driving gear 331, enabling the driven gear 332 teeth surfaces to position the expansion keyboards 2 such that they are concealed at the main keyboard 1 internal section (as shown in FIG. 2); when the user presses the push button assembly 31 push button 311, the push button 311 beveled surface 313 nudges the thrust block 314 into lateral movement, which simultaneously moves the transmissive coupling rod 32 front extremity such that by means of the hinge pin section P serving as a fulcrum, the transmissive coupling rod 32 extremity pivots towards the other side and, at the same time, the compressed spring assembly 34 return spring 343 causes the disengagement of the transmissive coupling rod 32 pawl block 321 from the driving gear 331, at which time the torque springs 11 are no longer forcibly held down and as they revert to original position the expansion keyboards 2 are impelled outward (as shown in FIG. 4); following which, the push button 311 is released such that the transmissive coupling rod 32 is once again shoved back to original position by the return spring 343, causing the transmissive coupling rod 32 pawl block 321 to re-engage the driving gear 331, keeping the expansion keyboards 2 that were impelled out positioned at the two sides of the main keyboard 1 (as shown in FIG. 5).

Figure 6:
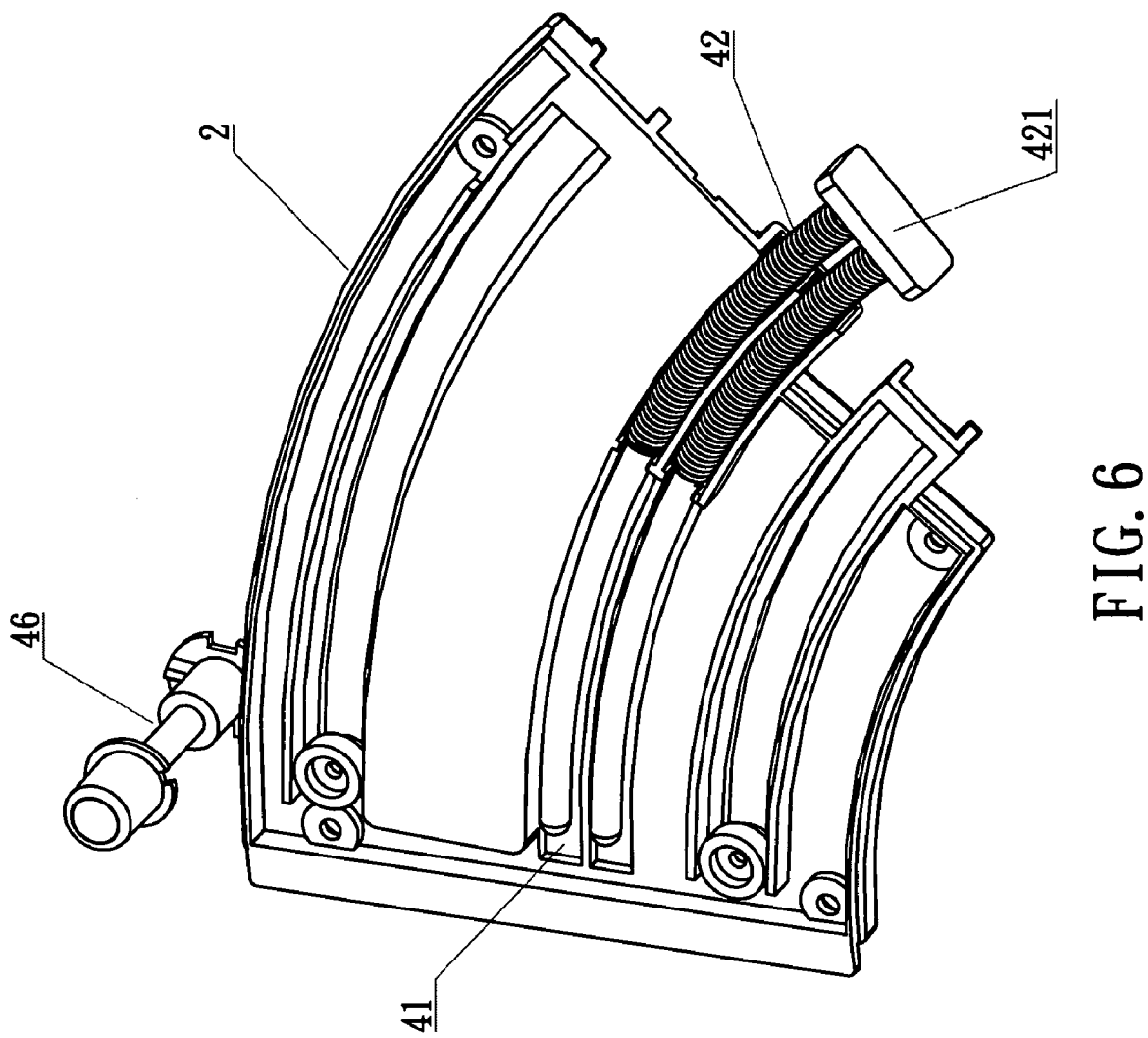
FIG. 6 is an isometric drawing of another assistive expansion keyboard outward impelling embodiment, as viewed from a superior perspective.
Figure 7:
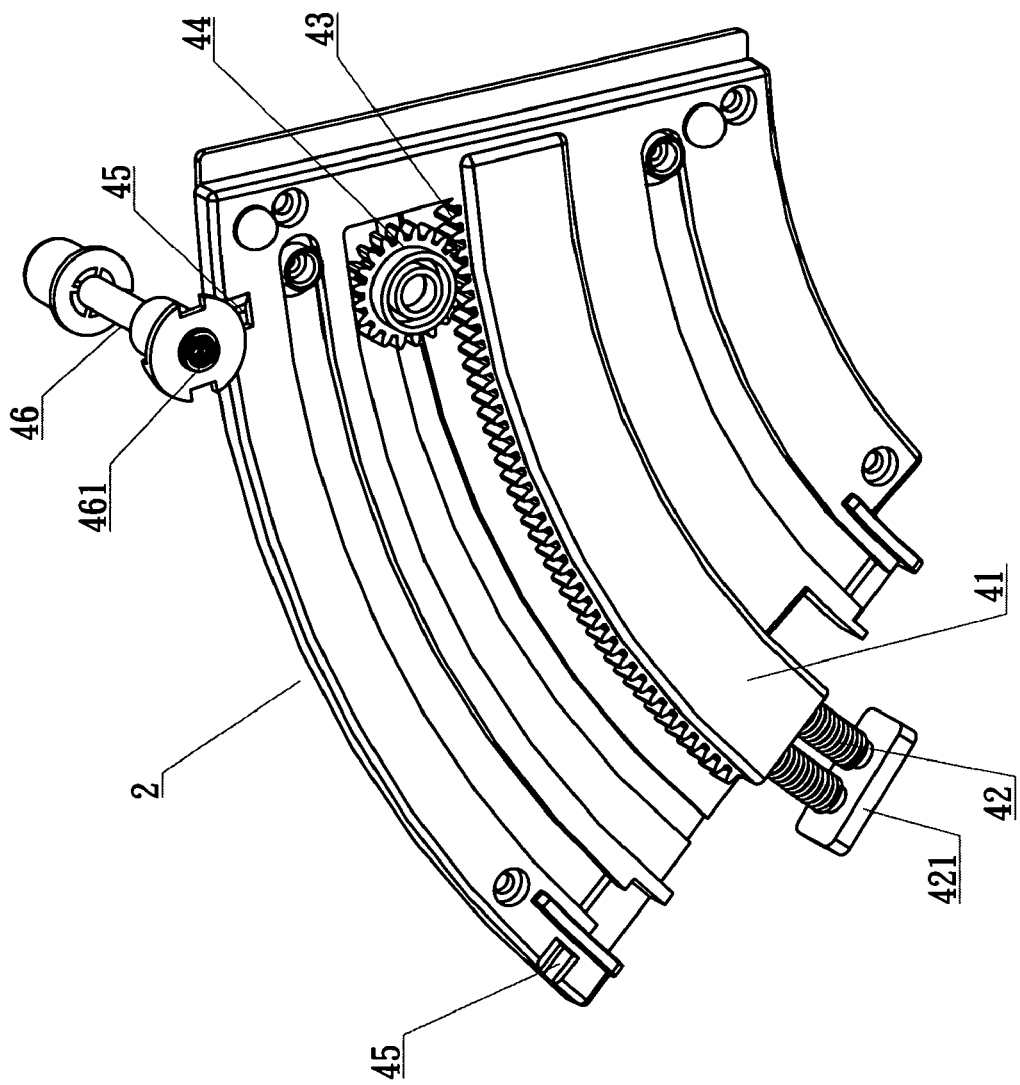
FIG. 7 is an isometric drawing of another assistive expansion keyboard outward impelling embodiment, as viewed from an inferior perspective.
Figure 8:
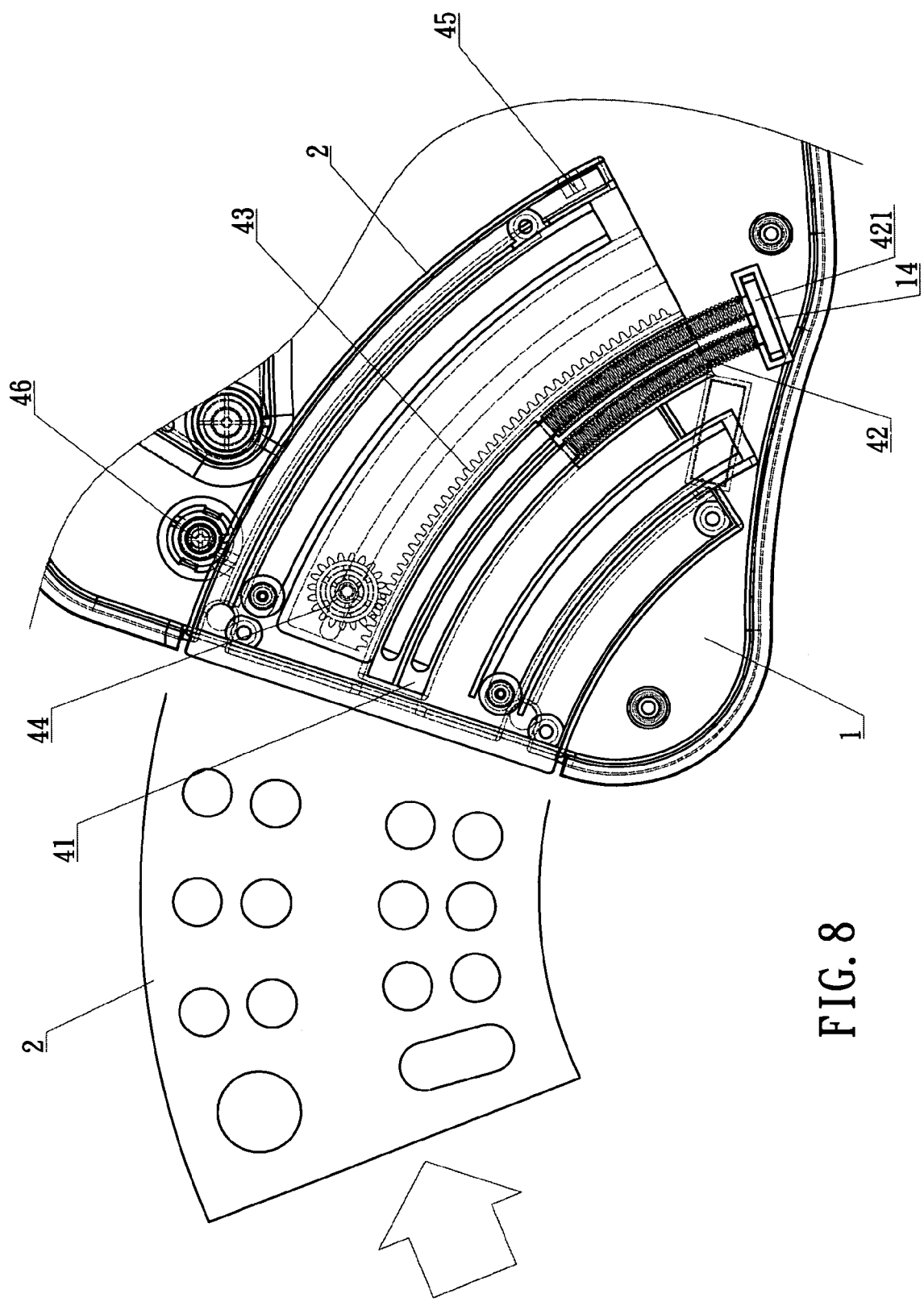
FIG. 8 is an orthographic drawing of another expansion keyboard and main keyboard conjoinment embodiment.

Referring to FIG. 6, FIG. 7, and FIG. 8, the drawings of another assistive expansion keyboard outward impelling embodiment, the operation of the expansion keyboard drive structure 4 consists of a parallel, curvatured containment slot 41 along the bottom surface of each expansion keyboard 2 and, furthermore, two arcuate springs 42 placed in the containment slot 41; a locating block 421 is attached to the extremities of the said arcuate springs 42 and, furthermore, the locating block 421 is fitted into the main keyboard 1 mounting receptacle 14 such that the arcuate spring 42 extremities are fixed; a teeth surface 43 is also arrayed along the bottom side of the said containment slot 41 and, furthermore, the teeth surface 43 is enmeshed to a gear wheel 44 at the side, thereby constituting an assistive, buffered expansion keyboard 2 outward impelling force channel; two retaining grooves 45 are disposed at a suitable distance along the top lateral edges of the expansion keyboards 2 and, furthermore, a push button switch 46 engages the first retaining groove 45, the said push button switch 46 top end protrudes though the main keyboard 1 top surface, and a spring 461 at the internal section extends to the main keyboard 1 bottom surface, to provide for, after the push button switch 46 from the main keyboard 1 top section is pressed, releasing the expansion keyboards 2 from the engaged state, this enables the expansion keyboards 2 to be impelled outward from both sides of the main keyboard 1, and after the push button switch 46 is no longer pressed, the push button switch 46 engages the expansion keyboard 2 second retaining groove 45, thereby preventing separation and the outward impelling of the expansion keyboards 2.

Since the said main keyboard 1 has expansion keyboards 2 disposed at its two sides and, furthermore, when not utilized the expansion keyboards 2 are concealed within the internal section of the main keyboard 1 such that the overall keyboard physical size remains unchanged even though numerous hot keys are available for user utilization, the invention herein provides for shipping without occupying additional space by effectively reducing shipping dimensions.

The invention claimed is:

1. A keyboard augmenting hot key structure comprising a main keyboard having expansion keyboards disposed at its lateral ends, the said expansion keyboards each situated on a preloaded torque spring in main keyboard internal section; a drive structure maintains the said expansion keyboards within the main keyboard internal section such that when the said expansion keyboards are not utilized, they are concealed within the internal section of the said main keyboard; when the said expansion keyboards are utilized, the operation of the said drive structure torque springs impels the said expansion keyboards outward from the said main keyboard such that given the unchanged, overall keyboard physical size, there is usable space for accommodating numerous hot keys, providing for shipping without occupying additional space by effectively reducing shipping dimensions wherein the said drive structure is comprised of a push button assembly, a transmissive coupling rod, a transmissive gear assembly, and a spring assembly.

2. The keyboard augmenting hot key structure of claim 1, wherein the said main keyboard has keycaps disposed in an inverted-V formation and, furthermore, a main keyboard lower end position that provides for resting both hands of the user is a contoured surface facilitating hand comfort and support.

3. The keyboard augmenting hot key structure of claim 1, wherein the said push button assembly push button protrudes through the said main keyboard surface and, furthermore, a spring is installed inside the said push button, a beveled surface is formed around the lower circumferential edge of the said push button, and a thrust block is situated against the said beveled surface.

4. The keyboard augmenting hot key structure of claim 1, wherein the said transmissive coupling rod including a front extremity having an end against the side of a push button assembly thrust block, a pawl block projects from the bottom surface of the extremity, the said pawl block is against transmissive gear assembly driving gear and a locating block protrudes from the top surface of the said transmissive coupling rod extremity to appropriately limit the position of the said spring; additionally, the said transmissive coupling rod center section is movably disposed at the said main keyboard internal section such that the said transmissive coupling rod pivots on a hinge pin section.

5. The keyboard augmenting hot key structure of claim 1, wherein the said transmissive gear assembly includes synchronously rotating a driving gear and a driven gear, the teeth surface of the said driving gear providing for contact against the said transmissive coupling rod pawl block, the said driven gear enmeshed with the teeth surface of an expansion keyboard case edge such that when the said transmissive gear assembly rotates, the said expansion keyboard swings out.

6. The keyboard augmenting hot key structure of claim 1, wherein the said spring assembly at the said main keyboard internal section is pre-positioned in a mounting seat on the side of a transmissive coupling rod locating block and, furthermore, a guide post extends from the inside of the said mounting seat, with a return spring situated between the said guide post and the said transmissive coupling rod locating block to restore the position of the said transmissive coupling rod.

7. A keyboard augmenting hot key structure comprising a main keyboard having expansion keyboards disposed at its lateral ends, the said expansion keyboards each impelled outward from the said main keyboard by means of a governing drive structure and, furthermore, when the said expansion keyboards are not utilized, they are concealed within an internal section of the said main keyboard such that given the unchanged, overall keyboard physical size, there is usable space for accommodating numerous hot keys, providing the users to collect the expansion keyboards at will and without occupying space when the expansion keyboards are not utilized wherein said drive structure that governs the outward impelling of an expansion keyboards comprises a parallel, curved containment slot along the bottom surface of each said expansion keyboard and, furthermore, two arcuate springs placed in the containment slot; a locating block is attached to the extremities of the said arcuate springs and, furthermore, the said locating block is fitted into a main keyboard mounting receptacle such that the said arcuate spring extremities are fixed, a teeth surface is also arrayed along the bottom side of the said containment slot and, furthermore, the said teeth surface is enmeshed to a gear wheel at the side, thereby constituting an assistive, buffered expansion keyboard outward impelling force channel; first and second retaining grooves are disposed at a suitable distance along the top lateral edges of the said expansion keyboards and, furthermore, a push button switch engages the first said retaining groove, a top end of the said push button switch protrudes through the said main keyboard top surface, and a spring at the internal section extends to the said main keyboard bottom surface, to provide for, after the said push button switch from the main keyboard top section is pressed, releasing the said expansion keyboards from the engaged state, this enables the said expansion keyboards to be impelled outward from both sides of the said main keyboard, and after the said push button switch is no longer pressed, the said push button switch engages the said expansion keyboard second retaining groove, thereby preventing separation and the outward impelling of the said expansion keyboard.

* * * * *